(12) United States Patent
Je et al.

(10) Patent No.: US 8,113,054 B2
(45) Date of Patent: Feb. 14, 2012

(54) CAPACITIVE ACCELEROMETER

(75) Inventors: Chang-Han Je, Daejeon (KR); Gunn Hwang, Seoul (KR); Sung-Hae Jung, Daejeon (KR); Myung-Lae Lee, Daejeon (KR); Chang-Auck Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 348 days.

(21) Appl. No.: 12/517,068

(22) PCT Filed: Dec. 5, 2007

(86) PCT No.: PCT/KR2007/006284
§ 371 (c)(1),
(2), (4) Date: May 30, 2009

(87) PCT Pub. No.: WO2008/069573
PCT Pub. Date: Jun. 12, 2008

(65) Prior Publication Data
US 2010/0050771 A1    Mar. 4, 2010

(30) Foreign Application Priority Data

Dec. 5, 2006   (KR) .................. 10-2006-0122551
May 4, 2007    (KR) .................. 10-2007-0043804

(51) Int. Cl.
*G01P 15/125* (2006.01)
(52) U.S. Cl. .................................................. 73/514.32
(58) Field of Classification Search .. 73/514.32–514.35, 73/514.01
See application file for complete search history.

(56) References Cited

U.S. PATENT DOCUMENTS

| | | | | |
|---|---|---|---|---|
| 5,375,469 A | * | 12/1994 | Levy et al. | 73/514.23 |
| 5,747,991 A | * | 5/1998 | Ito et al. | 324/661 |
| 6,151,966 A | * | 11/2000 | Sakai et al. | 73/514.32 |
| 6,199,874 B1 | | 3/2001 | Galvin et al. | |
| 6,736,008 B2 | * | 5/2004 | Kumagai et al. | 73/504.14 |
| 6,792,805 B2 | * | 9/2004 | Murata et al. | 73/514.32 |
| 6,938,484 B2 | | 9/2005 | Najafi et al. | |
| 6,997,054 B2 | | 2/2006 | Tsugai | |
| 7,884,624 B2 | * | 2/2011 | Wang et al. | 324/686 |
| 2008/0150554 A1 | * | 6/2008 | Wang et al. | 324/686 |

FOREIGN PATENT DOCUMENTS

JP    08-159776 A    6/1996
(Continued)

OTHER PUBLICATIONS

Hyoungho Ko et al., "Two-Chip Implemented, Wafer-Level Hermetic Packaged Accelerometer for Tactical and Inertial Applications," The 13th International Conference on Solid-State Sensors, Actuators and Microsystems, Jun. 5-9, 2005, pp. 507-510, Seoul, Korea.

Pejman Monajemi et al., "Design Optimization and Implementation of a Microgravity Capacitive HARPSS Accelerometer," IEEE Sensors Journal, Feb. 2006, pp. 36-46, vol. 6, No. 1.

International Search Report for PCT/KR2007/006284 filed on Dec. 5, 2007.

(Continued)

*Primary Examiner* — Max Noori (57) ABSTRACT

A conventional capacitive accelerometer has a limitation in reducing a distance between a sensing electrode and a reference electrode, and requires a complex process and a separate method of correcting a clearance difference caused by a process error. However, the capacitive accelerometer of the present invention has high sensitivity, can be simply manufactured by maintaining a very narrow distance between a reference electrode and a sensing electrode, and can make it unnecessary to individually correct each manufactured accelerometer by removing or drastically reducing a functional difference due to a process error.

16 Claims, 7 Drawing Sheets

FOREIGN PATENT DOCUMENTS

| | | |
|---|---|---|
| JP | 10-300476 A | 11/1998 |
| JP | 2002-082127 A | 3/2002 |
| KR | 10-2000-0046474 A | 7/2000 |
| KR | 10-2005-0062296 A | 6/2005 |

OTHER PUBLICATIONS

Written opinion of the International Searching Authority for PCT/KR2007/006284 filed on Dec. 5, 2007.

* cited by examiner

CAPACITIVE ACCELEROMETER

TECHNICAL FIELD

This application claims the benefit of Korean Patent Application No. 10-2006-0122551, filed on Dec. 5, 2006 and Korean Patent Application No. 10-2007-0043804, filed on May 4, 2007, in the Korean Intellectual Property Office, the disclosure of which are incorporated herein in their entirety by reference.

The present invention relates to a capacitive accelerometer, and more particularly, to a capacitive accelerometer which has high sensitivity, can be simply manufactured by maintaining a narrow distance between a reference electrode and a sensing electrode, and can make it unnecessary to individually correct each manufactured accelerometer by removing or drastically reducing a functional variance due to a process error. This work was supported by the IT R&D program of MIC/IITA. [2006-S-054-01, Development of CMOS based MEMS processed multi-functional sensor for ubiquitous environment]

BACKGROUND ART

Ultra-small accelerometers have drawn much research interest due to their low cost, high performance, and the miniaturization trend of a variety of electronic devices used in automobiles, military systems, robot systems, and safety diagnostic systems. Among the ultra-small accelerometers, capacitive accelerometers measure the acceleration generated due to an external force by measuring a change in capacitance due to the acceleration, between a reference electrode and a sensing electrode.

Capacitance C is defined by Equation 1, and increases as a distance d between the electrodes decreases.

$$C = \varepsilon \frac{A}{d}. \quad (1)$$

Also, since a change in the capacitance C when the distance d between the electrodes is small is higher than that when the distance d between the electrodes is large, the smaller the distance d is, the more sensitive the accelerometers are. Accordingly, when ultra-small capacitive accelerometers are manufactured, it is very important to precisely reduce a distance between electrodes.

Figure 1:
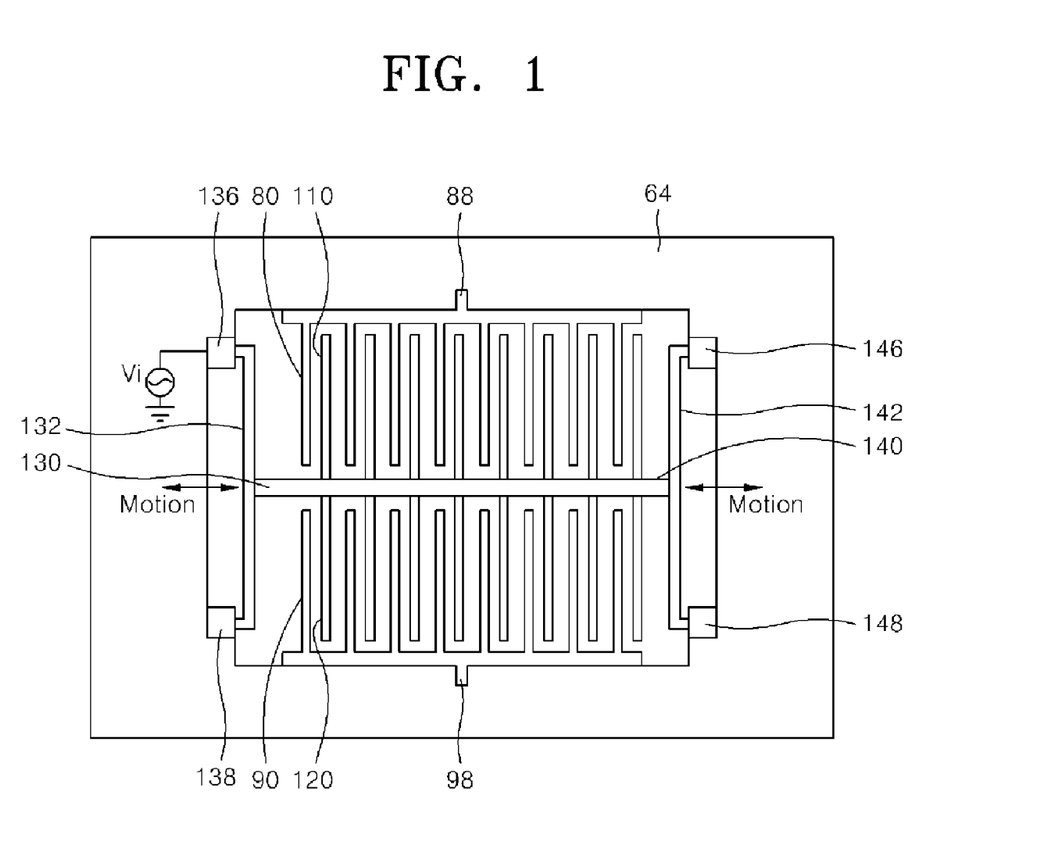
FIG. 1 is a plan view of a conventional accelerometer.

FIG. 1 is a plan view of a conventional ultra-small capacitive accelerometer manufactured by bulk micromachining.

Referring to FIG. 1, a substrate 64 is selectively etched to form sensing mass bodies 130 and 140 including sensing electrodes 110 and 120 and support springs 132 and 142, support parts 136, 138, 146, and 148 fixing the support springs 132 and 142 to the substrate 64 and acting as pads for applying signals, reference electrodes 80 and 90 spaced apart by a predetermined distance from the sensing electrodes 110 and 120, and pads 88 and 98 applying signals to the reference electrodes 80 and 90.

When acceleration is generated by an external force, the sensing mass bodies 130 and 140 are moved by an inertial force, and thus the distance between the sensing electrodes 110 and 120 and the reference electrodes 80 and 90 is changed. As a result, the capacitance between the sensing electrodes 110 and 120 and the reference electrodes 80 and 90 is changed and the acceleration can be measured according to the changed capacitance.

However, the conventional ultra-small capacitive accelerometer has a problem in that as an aspect ratio of the electrodes increases, a minimum distance between the electrodes is limited by a manufacturing process. Also, the distance between the sensing electrodes 110 and 120 and the reference electrodes 80 and 90 may be different for each manufactured accelerometer due to a process error, such as overetching, and thus each accelerometer must be individually corrected.

Figure 2A:
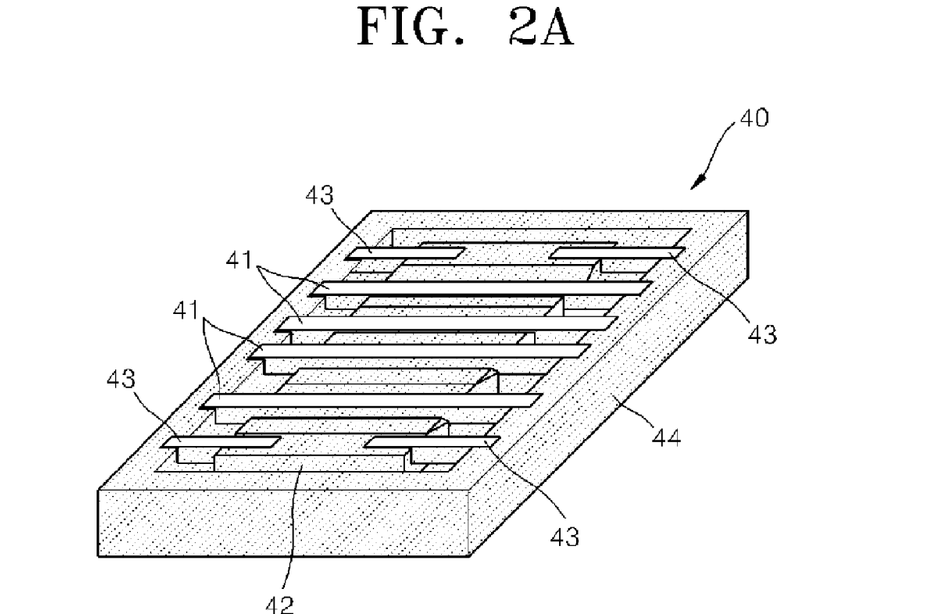
FIG. 2A is a perspective view of another conventional accelerometer.
Figure 2B:
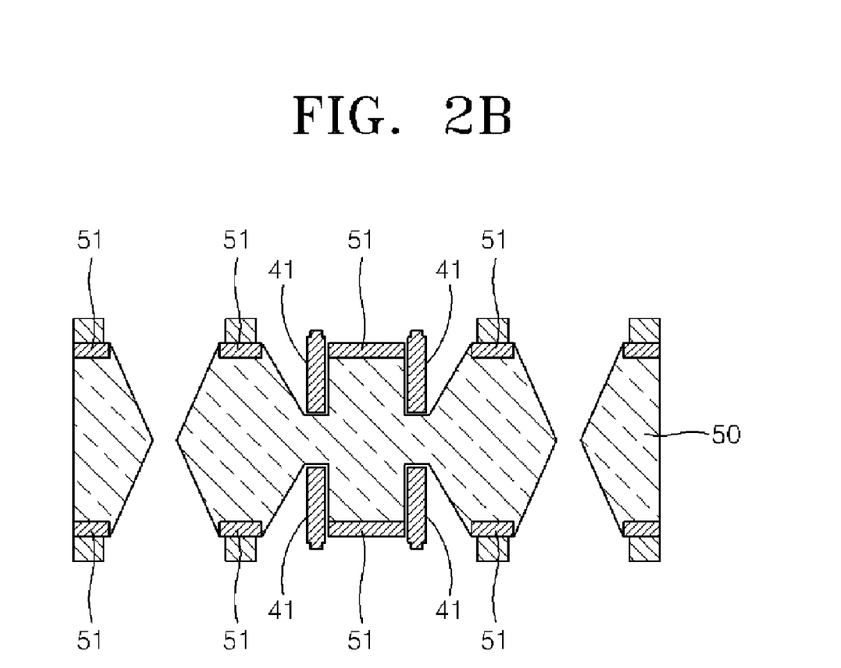
FIG. 2B is a cross-sectional view of the conventional accelerometer of FIG. 2A.

FIG. 2A is a perspective view of a conventional highly sensitive capacitive accelerometer manufactured by both bulk micromachining and surface micromachining. FIG. 2B is a cross-sectional view taken along a line perpendicular to the length direction of sensing electrodes 41 of the conventional highly sensitive capacitive accelerometer of FIG. 2A.

Referring to FIGS. 2A and 2B, sensing mass bodies 42 are formed by bulk micromachining, and support springs 51 and sensing electrodes 41 are formed by surface micromachining. A distance between the sensing electrodes 41 and the sensing mass bodies 42 is determined by the thickness of a deposited sacrificial layer, not shown, which surrounds the sensing electrodes 41 and is removed in FIG. 2B. The distance between the sensing electrodes 41 and the sensing mass bodies 42 can be narrowed. Also, since an entire substrate 40 is etched, sensitivity can be increased by sufficiently increasing the mass of the sensing mass bodies 42.

However, a method of manufacturing the conventional highly sensitive capacitive accelerometer is very complex and expensive, and has a high risk of causing a difference in sensitivity between different accelerometers due to a process error because it is difficult to precisely and uniformly control the thickness of the sacrificial layer.

Accordingly, there is a high demand for an accelerometer that can be simply manufactured at low cost and has a low risk of causing a difference in sensitivity between devices.

DISCLOSURE OF INVENTION

Technical Problem

The present invention provides a capacitive accelerometer that has high sensitivity, can be simply manufactured, and can make it unnecessary to individually correct each manufactured accelerometer.

Technical Solution

According to an aspect of the present invention, there is provided a capacitive accelerometer comprising: a substrate; a sensing mass body disposed above and spaced apart from the substrate, and comprising a mass main body, a support spring, and a sensing electrode; a support part coupling the sensing mass body to the substrate; a reference electrode disposed adjacent to the sensing electrode and movable farther away from or closer to the sensing electrode; a driving unit moving the reference electrode; and a stopper limiting the motion of the reference electrode.

An allowable clearance of the stopper may be less than a distance between the sensing electrode and the reference electrode when the driving unit is not driven.

When the driving unit is driven to move the reference electrode by a maximum distance toward the sensing electrode, a distance between the reference electrode and the sensing electrode may range from 0.2 to 0.7 mm.

Each of the sensing electrode and the reference electrode may have a comb shape, and teeth of the sensing electrode and teeth of the reference electrode may alternate with each other.

A distance A between the reference electrode and the sensing electrode when the driving unit is not driven may be equal to a sum of a distance B between the reference electrode and the sensing electrode when the driving unit is driven and an allowable clearance C of the stopper.

The driving unit may move the reference electrode by an electrostatic force. The driving unit may comprise a first finger, the capacitive accelerometer further comprising a reference electrode body comprising a plurality of reference electrodes, a connecting part connecting the plurality of reference electrodes, and a second finger spaced apart from and engaging with the first finger, wherein an allowable clearance of the stopper is less than a distance between the first finger and the second finger when the driving unit is not driven.

The stopper may be connected to the reference electrode by a spring.

According to another aspect of the present invention, there is provided a capacitive accelerometer comprising: a substrate; a reference electrode fixed to the substrate; a sensing mass body disposed above and spaced apart from the substrate, comprising a sensing electrode disposed adjacent to the reference electrode, a support spring, and a mass main body, and movable farther away from or closer to the reference electrode; a driving unit capable of moving the sensing mass body; and a stopper capable of limiting the motion of the sensing mass body caused by the driving unit.

An allowable clearance of the stopper may be less than a distance between the sensing electrode and the reference electrode when the driving unit is not driven.

When the driving unit is driven to move the sensing electrode by a maximum distance toward the reference electrode, a distance between the sensing electrode and the reference electrode may range from 0.2 to 0.7 mm.

Each of the sensing electrode and the reference electrode may have a comb shape, and teeth of the sensing electrode and teeth of the reference electrode may alternate with each other.

A distance a between the reference electrode and the sensing electrode when the driving unit is not driven may be equal to a sum of a distance b between the reference electrode and the sensing electrode when the driving unit is driven and an allowable clearance c of the stopper.

The driving unit may move the sensing mass body by an electrostatic force. The driving unit may comprise a first finger, wherein the sensing mass body further comprises a second finger extending from the support spring and spaced apart from and engaging with the first finger, wherein an allowable clearance of the stopper is less than a distance between the first finger and the second finger when the driving unit is not driven.

According to another aspect of the present invention, there is provided a capacitive accelerometer comprising: a substrate; a reference electrode disposed above and spaced apart from the substrate; a sensing electrode disposed above and spaced apart from the substrate; a driving unit capable of adjusting relative positions of the reference electrode and the sensing electrode; and a stopper capable of limiting the motion of the driving unit.

DESCRIPTION OF DRAWINGS

The above and other features and advantages of the present invention will become more apparent by describing in detail exemplary embodiments thereof with reference to the attached drawings in which.

BEST MODE

The present invention will now be described more fully with reference to the accompanying drawings, in which exemplary embodiments of the invention are shown. The invention may, however, be embodied in different forms and should not be construed as limited to the embodiments set forth herein. Rather, these embodiments are provided so that this disclosure will be thorough and complete, and will fully convey the scope of the invention to those skilled in the art. In the drawings, the same reference numeral denotes the same element. Further, various elements and regions shown in the drawings are schematically illustrated and thus the present invention is not limited to thicknesses or distances shown in the drawings.

The present invention provides a capacitive accelerometer comprising: a substrate; a sensing mass body disposed above and spaced apart from the substrate, and including a mass main body, a support spring, and a sensing electrode; a support part coupling the sensing mass body to the substrate; a reference electrode disposed adjacent to the sensing electrode and movable farther away from or closer to the sensing electrode; a driving unit moving the reference electrode; and a stopper limiting the motion of the reference electrode.

Figure 3:
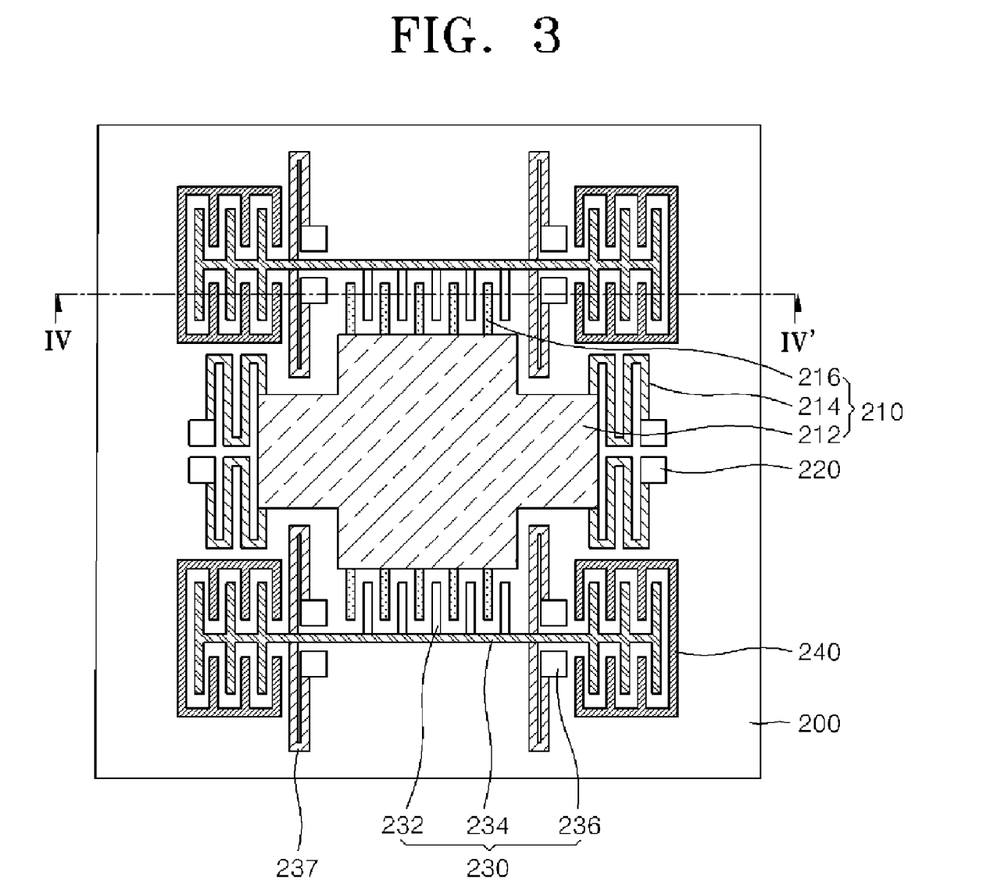
FIG. 3 is a plan view of an accelerometer according to an embodiment of the present invention.

FIG. 3 is a plan view of an accelerometer according to an embodiment of the present invention.

Referring to FIG. 3, a sensing mass body 210 is disposed above and spaced apart from a substrate 200. The sensing mass body 210 may include a mass main body 212, a support spring 214, and a sensing electrode 216.

The mass main body 212 may have an area great enough to have a sufficient mass. However, the present invention is not limited thereto, and for example, the mass main body 212 may have a beam shape. The sensing electrode 216 may be disposed on a side surface of the mass main body 212. At least one sensing electrode 216 may be used. The sensing electrode 216 may have a comb shape as shown in FIG. 3.

The support spring 214 is attached to an end of the mass main body 212. The support spring 212 may be coupled to the substrate 200 by a support part 220, such that the sensing mass body 210 is coupled to the substrate 200. The support spring 214 may have a zigzag shape as shown in FIG. 3, and may generate an elastic force with respect to a motion perpendicular to the repeated zigzag shape.

When acceleration is generated by an external force, the mass main body 212 is displaced from its initial position due to an inertial force, and thus the support spring 214 is deformed. The support spring 214 accumulates a restoring force corresponding to the deformation, and when the acceleration is stopped and the inertial force is removed, the mass main body 212 returns to its original position due to the restoring force of the support spring 214.

The reference electrode 232 may be disposed adjacent to the sensing mass body 210. Optionally, when a plurality of reference electrodes 232 is used, the reference electrodes 232 may be connected to one another by a connecting part 234.

The reference electrode 232 is disposed adjacent to the sensing electrode 216 of the sensing mass body 210, and is movable farther away from or closer to the sensing electrode 216. The reference electrode 232 may have a comb shape like the sensing electrode 216. In particular, both the sensing electrode 216 and the reference electrode 232 may have comb shapes, and teeth of the sensing electrode 216 and teeth of the reference electrode 232 may alternate with each other.

The stopper 236 limits the motion of the reference electrode 232. In order to explain in detail how the stopper 236 limits the motion of the reference electrode 232, a driving unit 240 and the stopper 236 are shown in FIG. 5.

Figure 5:
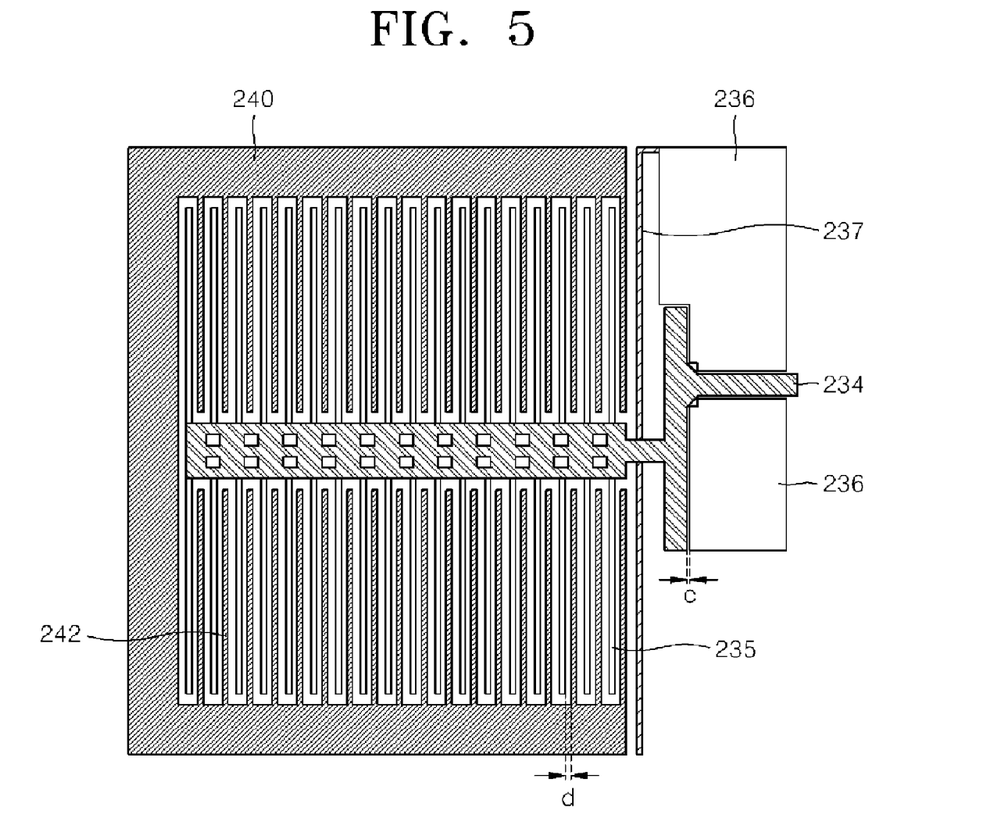
FIG. 5 is a plan view illustrating a relationship between a distance between a first finger and a second finger and an allowable clearance of a stopper.

FIG. 5 is a plan view illustrating a relationship between a distance between a first finger 242 and a second finger 235 and an allowable clearance of the stopper 236.

Referring to FIG. 5, the driving unit 240 has the first finger 242 having a comb shape, and the connecting part 234 having the second finger 235 formed on an end thereof, wherein the first finger 242 and the second finger 235 engage with each other. The reference electrode 232 and the connecting unit 234 may constitute a reference electrode body 230. Optionally, the connecting part 234 may be connected to the stopper 236 by a spring 237. The stopper 236 may be fixedly coupled to the substrate (rot shown).

When a potential opposite to that of the first finger 242 and the second finger 235 of the driving unit 240 is applied, the second finger 235 and the connecting part 234 are moved to the right side of FIG. 5 due to an electrostatic attractive force.

As shown in FIG. 5, a distance d between the first finger 242 and the second finger 235 before the potential is applied is greater than an allowable clearance c of the stopper 236. The allowable clearance c refers to a maximum distance by which the sensing mass body 210 can be moved when the driving unit 240 is driven. Accordingly, although the second finger 235 and the connecting part 234 are moved to the right side of FIG. 5 when the potential is applied, the motion of the connecting part 234 is limited by the stopper 236 before the first finger 242 contacts the second finger 235.

Since the connecting part 234 is moved by driving the driving unit 240, a distance between the reference electrode 232 and the sensing electrode 216 coupled to the connecting part 234 can be reduced. The distance between the reference electrode 232 and the sensing electrode 216 reduced by the driving of the driving unit 242 may range from 0.2 to 0.7 mm. If the distance between the reference electrode 232 and the sensing electrode 216 is less than 0.2 mm, a van der Waals force is increased disadvantageously.

The allowable clearance c of the stopper 236 is less than the distance between the sensing electrode 216 and the reference electrode 232 before the potential is applied. Otherwise, the sensing electrode 216 and the reference electrode 232 may contact each other.

Meantime, if the application of the potential is stopped, the reference electrode body 230 can return to its original position due to the restoring force of the spring 237.

Figure 4:
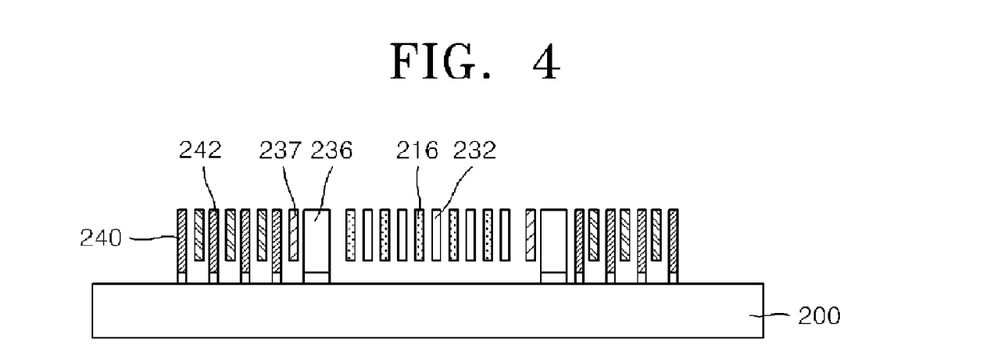
FIG. 4 is a cross-sectional view taken along line IV-IV' of FIG. 3.

Although the stopper 236 is connected to the connecting part 234 by the spring 237 in FIGS. 3 through 5, the present invention is not limited thereto, and the stopper 236 may not be connected to the connecting part 234 and the spring 237.

The driving unit 240 is not limited to FIG. 5, and may have any structure as long as the driving unit 240 can move the reference electrode 232 and/or the reference electrode body 230.

The advantages of the accelerometer constructed as described above will now be explained.

The accelerometer constructed as described above can maintain a narrow distance between the reference electrode 232 and the sensing electrode 216 and can be simply manufactured without a difference in capacitance between manufactured accelerometers. Since there is no difference in capacitance, a separate correcting process is unnecessary and the accelerometer can be simply manufactured at low costs and with high yield.

Figure 6:
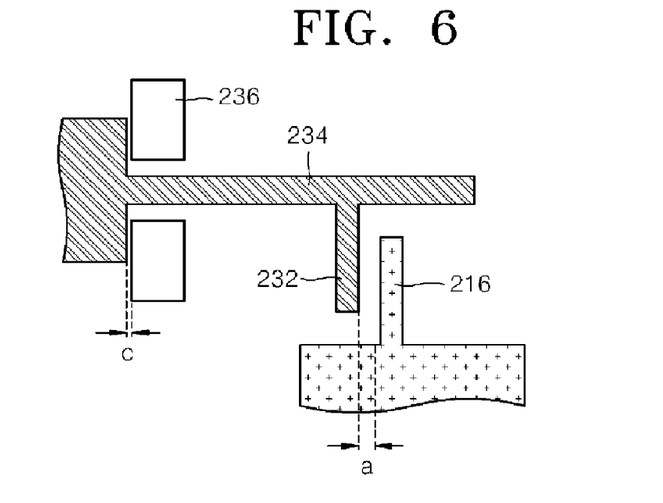
FIG. 6 is a conceptual view illustrating a relationship between a distance between a sensing electrode and a reference electrode and an allowable clearance of a stopper.

FIG. 6 is a conceptual view illustrating a relationship between the sensing electrode 216, the reference electrode 232, the connecting part 234, and the stopper 236. Referring to FIG. 6, when an allowable clearance of the stopper 236 is c and a distance between the sensing electrode 216 and the reference electrode 232 when the driving unit 240 is not driven is a, a distance between the reference electrode 232 and the sensing electrode 216 when the driving unit 240 moves the reference electrode 232 toward the sensing electrode 216 is (a−c).

Accordingly, since the distance (a−c) between the sensing electrode 216 and the reference electrode 232 is determined by the distance a between the sensing electrode 216 and the reference electrode 232 when the driving unit 240 is not driven and the allowable clearance c of the stopper 236, when a distance between the sensing electrode 216 and the reference electrode 232 needs to be reduced, a difference between the distance a and the allowable clearance c is reduced, thereby avoiding a burden for a process margin.

Conventional accelerometers have a difference in capacitance between them because they are etched to different degrees. The accelerometer according to the present invention can solve the problem. If it is assumed that the accelerometer is designed to have the distance a and the allowable clearance c as shown in FIG. 6 but each part is over-etched by e/2, the allowable clearance c of FIG. 6 becomes (c+e) and the distance d between the reference electrode 232 and the sensing electrode 216 becomes (a+e). Since the distance between the reference electrode 232 and the sensing electrode 216 when the driving unit 240 is driven is (a−c) obtained by subtracting the allowable clearance (c+e) from the distance (a+e), a distance between the reference electrode 232 and the sensing electrode 216 when the driving unit 240 is driven is (a−c) irrespective of the existence of over-etching.

Accordingly, the accelerometer of FIG. 3 can have an extremely fine structure without being limited by a process margin, and there is no functional variance between manufactured accelerometers.

FIG. 4 is a cross-sectional view taken along line IV-IV' of FIG. 3. Referring to FIG. 4, since the reference electrode 232, the sensing electrode 216, the second finger 235 formed on the end of the connecting part 234, and the spring 237 are spaced apart from the substrate 200, and thus the reference electrode 232, the sensing electrode 216, the second finger 235, and the spring 237 can be moved. The stopper 236 and the first finger 242 of the driving unit 240 may be fixed to the substrate 200.

Figure 7A:
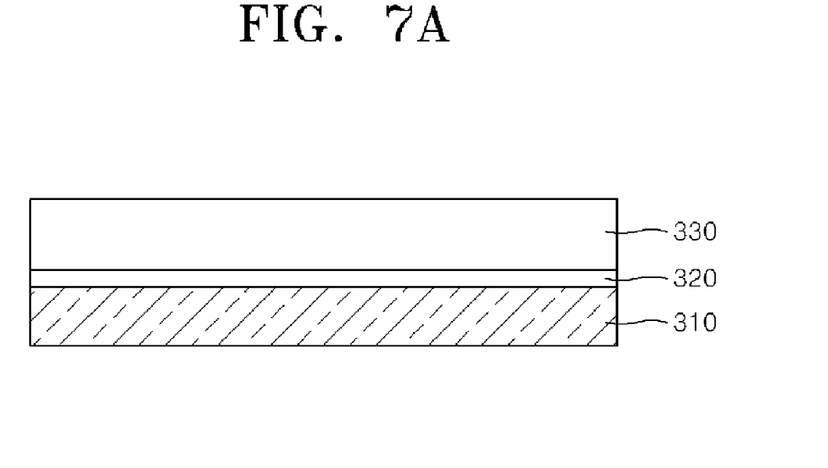
FIGS. 7A through 7C are side cross-sectional views for explaining a method of manufacturing a part of an accelerometer according to an embodiment of the present invention.
Figure 7B:
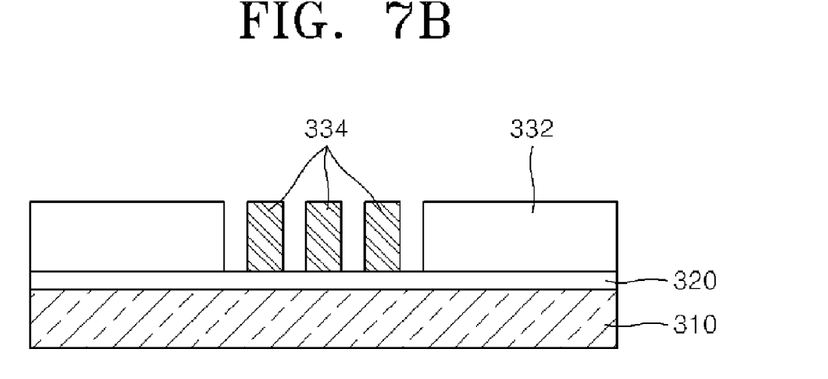

The substrate 200, and the reference electrode 232, the sensing electrode 216, the second finger 235, and the spring 237 disposed above and spaced apart from the substrate 200 may be manufactured using a conventional method. For example, referring to FIG. 7A, an oxide layer 320 is formed on a substrate 310, and then an auxiliary substrate 330 is formed on the oxide layer 320. Referring to FIG. 7B, a pattern 334 is formed on the auxiliary substrate 330 using photolithography.

Figure 7C:
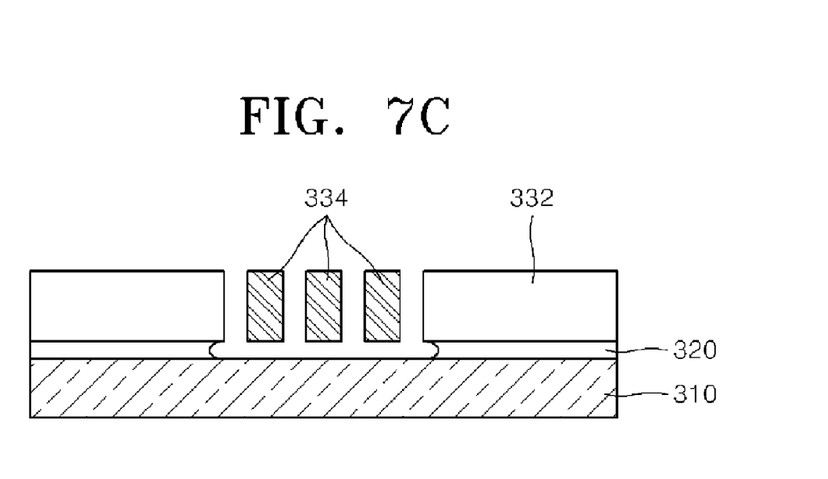

Referring to FIG. 7C, a part of the oxide layer 320 is removed by wet etching. The part of the oxide layer 320 removed by the wet etching may be disposed below the pattern 334, so that the pattern 334 can be spaced apart from the substrate 310 by a distance corresponding to the part of the oxide layer 320 removed by the wet etching. In this way, a part 332 fixed to the substrate 310 and the pattern 334 spaced apart from the substrate 310 can be manufactured.

Figure 8:
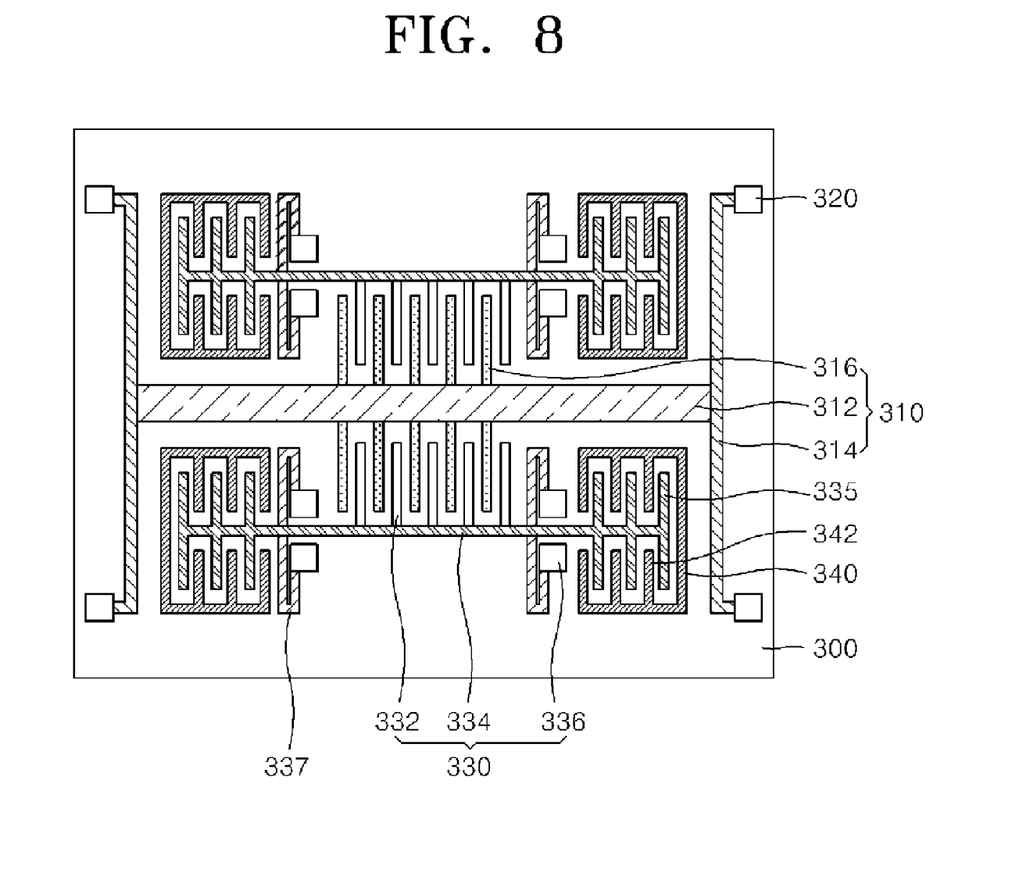
FIG. 8 is a plan view of an accelerometer according to another embodiment of the present invention.

FIG. 8 is a plan view of a capacitive accelerometer according to another embodiment of the present invention.

Referring to FIG. 8, a driving unit 340 and a reference electrode body 330 are almost identical to the driving unit 240 and the reference electrode body 230 of FIG. 3. However, a mass main body 312 has a beam shape, unlike the mass main body 212 having a plate shape of FIG. 3, and a support spring 314 has a beam shape, unlike the support spring 214 having a zigzag shape of FIG. 3.

In operation, like in FIG. 3, the driving unit 340 is driven, and an electrostatic force is generated between a first finger 342 and a second finger 335 to move the reference electrode body 330. The reference electrode body 330 is moved by the electrostatic force, and the motion of the reference electrode body 330 is limited by a stopper 336.

Due to the motion of the reference electrode body 330, a reference electrode 332 and a sensing electrode 316 get closer to each other. If the accelerometer is accelerated in this state, the accelerometer becomes more sensitive.

Once the accelerometer is accelerated, a sensing mass body 310 exerts an inertial force, and thus a distance between the reference electrode 332 and the sensing electrode 316 is changed to change capacitance. Accordingly, the accelerometer of FIG. 8 measures the acceleration using the changed capacitance. A support spring 314 is deformed by the inertial force generated by the sensing electrode 316 and the mass main body 312 and accumulates a restoring force. Then, when the accelerometer stops, the sensing mass body 310 returns to its original position due to the restoring force of the support spring 314.

After the operation of the accelerometer is stopped, the operation of the driving unit 340 is also stopped. If the driving unit 340 stops the operation, since a force applied between the first finger 342 and the second finger 335 is removed, the reference electrode body 330 returns to its original position due to a restoring force of a spring 337.

Figure 9:
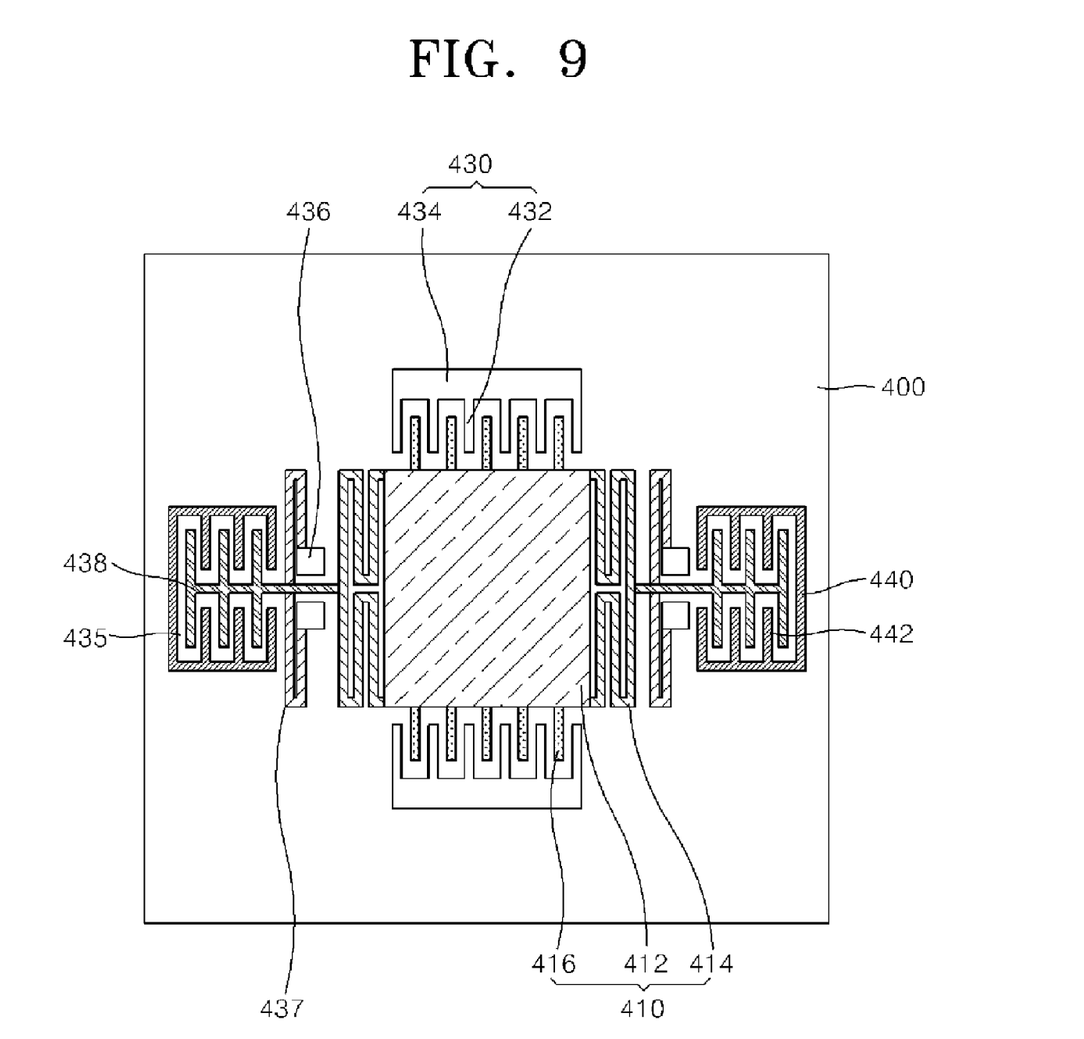
FIG. 9 is a plan view of an accelerometer according to still another embodiment of the present invention.

FIG. 9 is a plan view of a capacitive accelerometer according to another embodiment of the present invention. In FIG. 9, the capacitive accelerometer includes: a substrate 400; a reference electrode 432 fixedly disposed over the substrate 400; a sensing mass body 410 disposed above to be spaced apart from the substrate 400, including a sensing electrode 416 disposed adjacent to the reference electrode 432, a support spring 414, and a mass main body 412, and movable farther away from or closer to the reference electrode 432; a driving unit 440 moving the sensing mass body 410; and a stopper 436 limiting the motion of the sensing mass body 410 caused by the driving unit 440.

Referring to FIG. 9, the reference electrode 432 may be fixed to the substrate 400. In particular, when a plurality of reference electrodes 432 are used, the reference electrodes 432 may be connected to one another by a connecting part 434. Optionally, the reference electrode 432 and the connecting part 434 may be fixed to the substrate 400. Optionally, the reference electrode 432 may be fixedly disposed above and spaced apart from the substrate 400. Optionally, at least one reference electrode 432 may be used, and the reference electrode 432 may have a comb shape as shown in FIG. 9.

The sensing mass body 410 of FIG. 9 may be spaced apart from the substrate 400. The sensing mass body 410 includes the sensing electrode 416, the support spring 414, and the mass main body 412.

The mass main body 412 may have an area great enough to have a sufficient mass. However, the present invention is not limited thereto. For example, the mass main body 412 my have a beam shape. The sensing electrode 416 may be disposed on a side surface of the mass main body 412. At least one sensing electrode 416 may be used, and may have a comb shape as shown in FIG. 9. Optionally, each of the sensing electrode 416 and the reference electrode 432 may have a comb shape, and teeth of the sensing electrode 416 and teeth of the reference electrode 432 may alternate with each other.

The support spring 414 is attached to an end of the mass main body 412. The support spring 414 may have a zigzag shape like the support spring 214 of FIG. 3, and may generate an elastic force with respect to a motion perpendicular to the repeated zigzag shape.

The driving unit 440 may further include a first finger 442. As described above, the sensing mass body 410 may be spaced apart from the substrate 400, and may further include an extending part 438 extending from the support spring 414 and a second finger 435 extending from the extending part 438. By applying a potential between the first finger 442 and the second finger 435, the sensing mass body 410 can be moved.

The motion of the sensing mass body 410 is limited by the stopper 436. The stopper 436 may be fixed to the substrate 400, or may be connected to the extending part 438 by a spring 437.

The operation principle of the capacitive accelerometer of FIG. 9 will now be explained.

First, the sensing mass body 410 is moved by applying a potential between the first finger 442 and the second finger 435 until the motion of the sensing mass body 410 is limited by the stopper 436. The motion may be induced by an electrostatic force between the first finger 442 and the second finger 435. A distance between the sensing electrode 416 and the reference electrode 432 is reduced due to the motion of the sensing mass body 410. At this time, the support spring 414 is not deformed, and accordingly does not exert a restoring force. However, the spring 437 connecting the stopper 436 and the extending part 438 is deformed to exert a restoring force. A position of the sensing mass body 410 at this time is referred to as 'a ready position'.

Next, when acceleration is generated by an external force applied to the accelerometer of FIG. 9, the sensing mass body 410 is moved due to an inertial force, and the distance between the sensing electrode 416 and the reference electrode 432 is changed to change capacitance formed by the sensing electrode 416 and the reference electrode 432. The acceleration can be measured using the changed capacitance. A restoring force of the support spring 414 is generated by the motion of the sensing mass body 410.

When the acceleration stops and the velocity of the accelerometer is constant, the sensing mass body 410 returns to the ready position due to the restoring force of the support spring 414. Next, when the potential applied to the first finger 442 and the second finger 435 is removed, the sensing mass body 410 returns to its initial position.

A distance between the sensing electrode 416 and the reference electrode 432 when the driving unit 440 is not driven may be greater than an allowable clearance of the stopper 436. The allowable clearance refers to a maximum distance by which the sensing mass body 410 can be moved when the driving unit 440 is driven. In detail, a distance a between the sensing electrode 416 and the reference electrode 432 when the driving unit 440 is not driven is equal to a sum of a distance b between the sensing electrode 416 and the reference electrode 432 when the driving unit 440 is driven and an allowable clearance c.

Also, a distance between the first finger 442 and the second finger 435 when the driving unit 440 is not driven may be greater than an allowable clearance of the stopper 436. If the distance between the first finger 442 and the second finger 435 when the driving unit 440 is not driven is not greater than the allowable clearance of the stopper 436, the first finger 442 and the second finger 435 may contact each other.

The distance between the reference electrode 432 and the sensing electrode 416 reduced by the driving of the driving unit 440 may range from 0.2 to 0.7 mm. If the distance between the reference electrode 432 and the sensing electrode 416 reduced by the driving of the driving unit 440 is less than 0.2 mm, a van der Waals force is increased disadvantageously.

The accelerometers described with reference to the attached drawings according to the embodiments of the present invention are capacitive accelerometers each including: a substrate; a reference electrode disposed above and spaced apart from the substrate; a sensing electrode disposed above and spaced apart from the substrate; a driving unit adjusting relative positions of the reference electrode and the sensing electrode; and a stopper limiting the motion of the driving unit.

As described above, the capacitive accelerator according to the present invention has high sensitivity, can be simply manufactured by maintaining a narrow distance between the reference electrode and the sensing electrode, and can make it unnecessary to individually correct each manufactured accelerometer by removing or drastically reducing a functional difference due to a process error.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A capacitive accelerometer comprising:
a substrate;
a sensing mass body disposed above and spaced apart from the substrate, and comprising a mass main body, a support spring, and a sensing electrode;
a support part configured to couple the sensing mass body to the substrate;
a reference electrode disposed adjacent to the sensing electrode and movable with respect to the sensing electrode;
a driving unit configured to move the reference electrode to adjust a distance between the reference electrode and the sensing electrode; and
a stopper configured to limit the motion of the reference electrode.

2. The capacitive accelerometer of claim 1, wherein the stopper is configured to limit an adjustment distance B by which the reference electrode is moved by the driving unit such that it is less than a before-adjustment distance A between the sensing electrode and the reference electrode when the driving unit is not driven.

3. The capacitive accelerometer of claim 1, wherein the distance between the reference electrode and the sensing electrode is adjusted by 0.2 to 0.7 mm.

4. The capacitive accelerometer of claim 1, wherein each of the sensing electrode and the reference electrode has a comb shape, and teeth of the sensing electrode and teeth of the reference electrode alternate with each other.

5. The capacitive accelerometer of claim 1, wherein a before-adjustment distance A between the reference electrode and the sensing electrode is substantially equal to a sum of (1) an adjustment distance B by which the reference electrode moves by the driving unit and (2) an after-adjustment distance C which is defined by the stopper.

6. The capacitive accelerometer of claim 1, wherein the driving unit moves the reference electrode by an electrostatic force.

7. The capacitive accelerometer of claim 6, the capacitive accelerometer further comprising:
a first finger coupled to the driving unit finger, and
a second finger coupled to the reference electrode,
wherein the second finger is configured to be spaced apart from and engaging with the first finger,
wherein the stopper limits an adjustment distance B to be less than a before-adjustment distance D between the first finger and the second finger when the driving unit is not driven, and
wherein the adjustment distance B is a distance that the reference electrode moves by the driving unit.

8. The capacitive accelerometer of claim 1, wherein the stopper is connected to the reference electrode by a spring.

9. A capacitive accelerometer comprising:
a substrate;
a reference electrode fixed to the substrate;
a sensing mass body disposed above and spaced apart from the substrate, comprising a sensing electrode disposed adjacent to the reference electrode, a support spring, and a mass main body, and movable with respect to the reference electrode;
a driving unit configured to move the sensing mass body to adjust a distance between the reference electrode and the sensing electrode; and
a stopper configured to limit the motion of the sensing mass body caused by the driving unit.

10. The capacitive accelerometer of claim 9, wherein the stopper is configured to limit an adjustment distance B that the sensing electrode moves by the driving unit to be less than a before-adjustment distance A between the sensing electrode and the reference electrode when the driving unit is not driven.

11. The capacitive accelerometer of claim 9, wherein an adjustment distance B that the sensing electrode is moved by the driving unit is adjusted by 0.2 to 0.7 mm.

12. The capacitive accelerometer of claim 9, wherein each of the sensing electrode and the reference electrode has a comb shape, and teeth of the sensing electrode and teeth of the reference electrode alternate with each other.

13. The capacitive accelerometer of claim 9, wherein a before-adjustment distance A between the reference electrode and the sensing electrode when the driving unit is not driven is substantially equal to a sum of (1) an adjustment distance B by which the sensing electrode moves when the driving unit is driven and (2) an after-adjustment distance C defined by the stopper.

14. The capacitive accelerometer of claim 9, wherein the driving unit moves the sensing mass body using an electrostatic force.

15. The capacitive accelerometer of claim 14, the capacitive accelerometer further comprising:
- a first finger coupled to the driving unit, and
- a second finger extending from the support spring of the sensing body,
- wherein the second finger is spaced apart from and engaged with the first finger, and
- wherein the stopper is configured to limit an adjustment distance B that the sensing electrode is moved by the driving unit to be less than a before-adjustment distance D between the first finger and the second finger when the driving unit is not driven.

16. A capacitive accelerometer comprising:
- a substrate;
- a reference electrode disposed above and spaced apart from the substrate;
- a sensing electrode disposed above and spaced apart from the substrate and configured to interdigitate with the reference electrode;
- a driving unit configured to adjust a relative distance between the reference electrode and the sensing electrode; and
- a stopper configured to limit an adjustment distance by the driving unit.

* * * * *